(12) United States Patent
Coers et al.

(10) Patent No.: US 8,180,533 B2
(45) Date of Patent: May 15, 2012

(54) DEVICE AND METHOD FOR REDUCING TIRE WEAR ON AN AGRICULTURAL VEHICLE

(75) Inventors: Bruce A. Coers, Hillsdale, IL (US);
Daniel J. Burke, Cordova, IL (US);
Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 938 days.

(21) Appl. No.: 12/194,769

(22) Filed: Aug. 20, 2008

(65) Prior Publication Data

US 2010/0043369 A1 Feb. 25, 2010

(51) Int. Cl.
*G06F 19/00* (2011.01)

(52) U.S. Cl. .......................................... 701/50

(58) Field of Classification Search .................... 701/50; 56/10.1, 10.2 R, 10.8; 460/119
See application file for complete search history.

(56) References Cited

U.S. PATENT DOCUMENTS 7,555,884 B2 * 7/2009 Janning ........................ 56/15.4
* cited by examiner

*Primary Examiner* — Kim T Nguyen
(74) *Attorney, Agent, or Firm* — Taylor IP, P.C.

(57) ABSTRACT

An agricultural work machine having a chassis with an operating direction and a transport system coupled to the chassis. The transport system includes a plurality of wheels including a first wheel and a wheel repositioning system. The wheel repositioning system is operatively connected to the first wheel. The wheel repositioning system is configured to adjust a position of the first wheel in a direction substantially normal to the operating direction while the chassis is moving in the operating direction.

21 Claims, 2 Drawing Sheets

DEVICE AND METHOD FOR REDUCING TIRE WEAR ON AN AGRICULTURAL VEHICLE

FIELD OF THE INVENTION

The present invention relates to an apparatus and method for reducing tire wear on an agricultural work machine, and, more particularly to the adjustment of wheels to reduce tire wear on an agricultural vehicle.

DESCRIPTION OF THE RELATED ART

Agricultural machines, in particular combines, have headers that harvest crop leaving cut stubble after the harvesting head removes a portion of the agricultural crop. Combines are known to have contour adjusting capability so that the chassis of the combine remains substantially vertical while the wheels traverse a slope and the header is adjusted to conform to the slope for the harvesting of the crop. As the crop is cut, the cut stubble that is left behind the header can cause significant damage to tires of the combine. This problem may be made worse by the large wheels that are currently used on large combines because they are not able to fit between the rows due to the small row spacing that is commonly used in today's agricultural planting systems. As the tire is running continuously on a row in one place the tire may be prematurely worn out due to the cutting action of the sharp stubble on the same area of the tire in a circumferential direction as the tire impacts the row of the cut stubble thereby intensifying the effect on the tire. This is particularly true on modern combines since the cutting action of the header results in stubble that is sharp due to the increasingly efficient cutting systems utilized on current headers.

What is needed in the art is a method and apparatus to reduce the wear on expensive tires, particularly the wear that leads to premature failure of the tires.

SUMMARY OF THE INVENTION

The present invention repositions the wheels of an agricultural work vehicle and reduces tire wear thereon.

The invention in one form is directed to an agricultural work machine having a chassis with an operating direction and a transport system coupled to the chassis. The transport system includes a plurality of wheels including a first wheel and a wheel repositioning system. The wheel repositioning system is operatively connected to the first wheel. The wheel repositioning system is configured to adjust a position of the first wheel in a direction substantially normal to the operating direction while the chassis is moving in the operating direction.

DETAILED DESCRIPTION OF THE INVENTION

Figure 1:
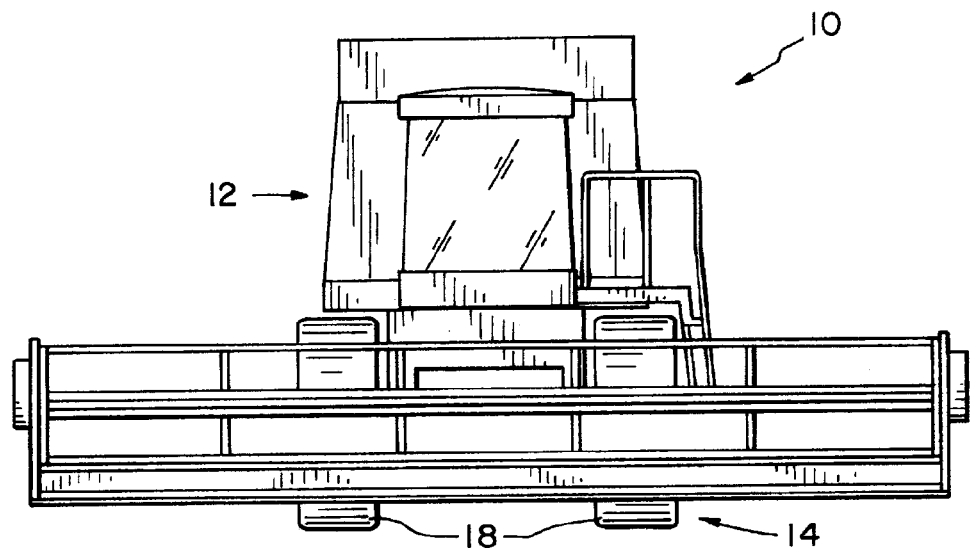
FIG. 1 is a view of a ground engaging vehicle, in the form of an agricultural vehicle that utilizes an embodiment of the wheel repositioning system of the present invention.
Figure 2:
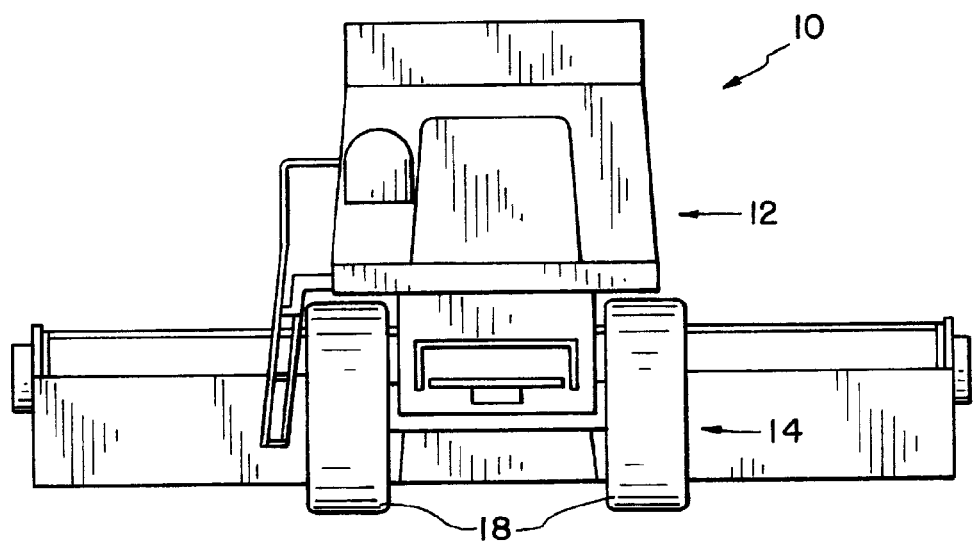
FIG. 2 is another view of the agricultural vehicle of FIG. 1.

Referring now to the drawings, and more particularly to FIGS. 1 and 2, there is shown a work machine 10, also illustrated as a harvesting machine 10, known as a combine 10 that is utilized to harvest row crops in an agricultural field. Work machine 10 includes a chassis 12 coupled to a transport system 14. Chassis 12 may include grain processing, grain cleaning, grain storage and grain transport systems. Additionally chassis 12 includes an operator cab having operator controls therein. Transport system 14 transports chassis 12 across the field so that work machine 10 can perform its intended function.

Figure 3:
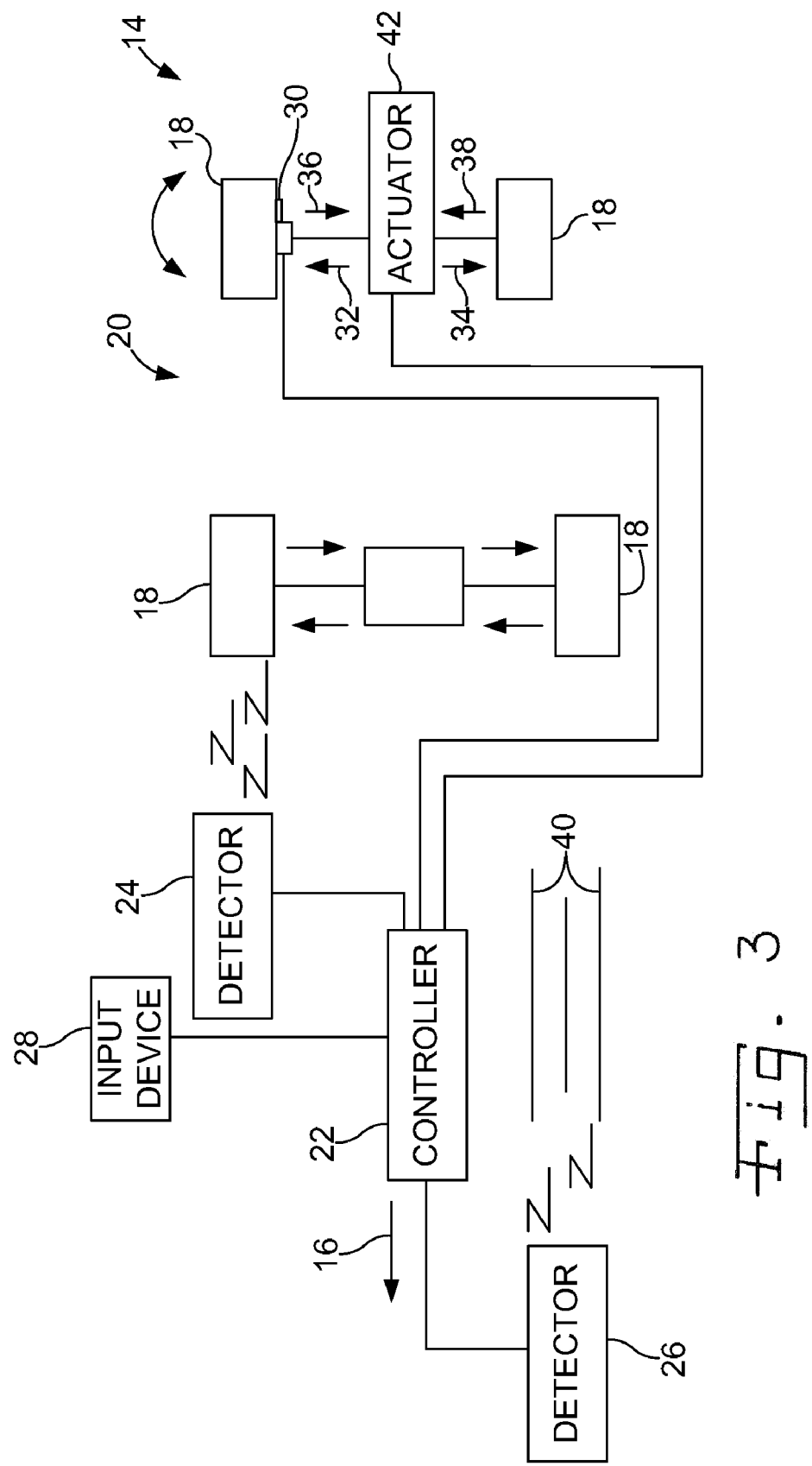
FIG. 3 is a schematized diagram illustrating more than one embodiment of the present invention utilized on the agricultural vehicle of FIGS. 1 and 2.

Now, additionally referring to FIG. 3 transport system 14 is schematically illustrated as moving in a direction 16. Transport system 14 includes wheels 18 and wheel repositioning system 20. Wheel repositioning system 20 includes a controller 22, a wheel wear detector 24, a row spacing detector 26, an input device 28, a steering angle detector 30 and an actuator 42. For purposes of clarity repositioning system 20 will be discussed as applying to the rear axle of combine 10, but the invention can apply to either axle or both axles.

The view in FIG. 3 is schematically shown as a top view with transport system 14 moving in a direction 16 encountering rows 40 of cut crop stubble. Repositioning system 20 includes actuators 42 that can be utilized by controller 22 to move wheels 18 in directions 32 through 38 as illustrated on one set of wheels 18. Actuator 42 may extend wheels 18 by repositioning axles upon which wheels 18 rotate or may function to reposition wheels 18 along an axis schematically illustrated as the connecting line between actuator 42 and wheels 18. Alternatively, wheels 18 may be on separate axles that are generally axially aligned with each other having actuator 42 configured to reposition the position of wheel 18 as it encounters cut crop stubble.

Wheel wear detector 24 detects the wear of the tire rubber along the face of wheel 18 so that information therefrom is used by controller 22 to decide when to reposition wheels 18. Controller 22 sends control commands to actuator 42 to reposition at least one wheel 18 to change the position of the wear that is inflicted upon the tire by the cut crop stubble, thereby distributing the wear across the face of wheel 18. Additionally or alternatively, the positioning of the rows is detected by a row spacing detector 26 to determine where the rows of the cut crop stubble are positioned, so that it can be anticipated where the wear will occur on the tire, as the tires encounter rows 40. Additionally, input device 28, positioned in the operator cab, can be utilized by an operator to command a certain position of tires 18 to adjust for row spacing. If practical, the wheels can be adjusted to run between rows 40, or wheels 18 can simply be positioned based on an input from the operator.

Controller 22 commands actuator 42 to adjust wheels 18 in directions 32 and 34 substantially the same distances in opposite directions or may adjust one wheel 18 in a direction 32 one distance and the opposite wheel 18 in direction 34 a different distance, which may be the case if the wheel spacings need to be different to accommodate row spacings or tire wear. Controller 22 is additionally connected with steering angle detector 30 so that the automatic spacing of tires 18 can be temporarily suspended while combine 10 is being turned, which would have significant impact on the information from row spacing detector 26. Alternatively, the information from row spacing detector 26 may be utilized if it is consistent over a certain period of time and disregarded when inconsistencies occur, for example as a result of traversing rows or at the ends of a field where rows running in different directions may be encountered.

Steering angle detector 30 may be associated with a ground engaging wheel as illustrated or the steering angle may be obtained from input commands from the operator in the cab of combine 10. Additionally, if steering angle detector 30 detects an extreme angle turn, at least one of wheels 18 may be extended to the widest possible extent to provide additional stability to work machine 10 as it turns.

The adjustable axle can be adjusted on the go, while combine 10 is moving in direction 16, from the operator's station by manually entering the information in input device 28, or wheel repositioning system 20 can function automatically with input from such devices as a tire wear detector 24 or row spacing detector 26. The tire wear can be dramatically reduced, thereby extending the tire life substantially by adjusting the position of wheels 18 in the direction that is substantially perpendicular to direction 16. The same portions of the tires are then not always running on the cut stubble of the row. This allows the wear to be more evenly distributed across the full width of the tire and not just in one location. Repositioning system 20 adjusts for row spacing at specific intervals so that the tire wear becomes very uniform. For example, row spacing between rows 40 may be encountered at two positions along a tire 18. Those positions can be varied over time to reduce the wear that is being encountered along any one annular ring of the tire. If work machine 10 is running in rows that are spaced such that the tires can fit between the rows, then the wheel spacing can be set to run between the rows to improve the tire life even further. This can be tied in to selections on operator input device 28 based upon crop row spacing.

The repositioning of the wheels by repositioning system 20 can be done on a time duration method, where the position of wheels 18 can be moved after the passage of a selected duration of time. For example, after the passage of a predetermined time of two hours wheels 18 may be moved a predetermined distance of two inches. This can be repeated until the wheels have been moved to one extreme, then the method moves wheels 18 in the opposite direction, in two hour increments, until the other extreme of movement is met.

By moving the axle in and out at uniform intervals to distribute the wear over the full width of the tire, the tire wear can be dramatically reduced, significantly extending the life of expensive agricultural tires, reducing the overall cost of repairs and downtime for the machine. By making the axle adjustable, the axle extension can be easily adjusted causing the wheels to operate between the rows in crops where the tires are small enough to fit between the rows. In the automatic mode the spacing and selection of tire/wheel positioning relative to row spacing is done automatically so that the operator does not have to determine where to set the wheel spacing.

Having described the preferred embodiment, it will become apparent that various modifications can be made without departing from the scope of the invention as defined in the accompanying claims.

The invention claimed is:

1. An agricultural work machine, comprising:
   a chassis having an operating direction; and
   a transport system coupled to said chassis, said transport system including:
   a plurality of wheels including a first wheel; and
   a wheel repositioning system operatively connected to said first wheel, said wheel repositioning system configured to adjust a position of said first wheel in a direction substantially normal to said operating direction while said chassis is moving in said operating direction, said plurality of wheels further includes a second wheel, said wheel repositioning system being additionally configured to adjust a position of said second wheel in a direction substantially normal to said operating direction, said wheel repositioning system being configured to move said first wheel and said second wheel a predetermined distance dependant upon a passage of a predetermined time.

2. The agricultural work machine of claim 1, further comprising an operator input device configured to accept a spacing selection from an operator, said input device providing information to said wheel repositioning system, said wheel repositioning system being configured to move said first wheel and said second wheel dependent upon said spacing selection.

3. The agricultural work machine of claim 1, wherein said first wheel and said second wheel are adjusted substantially equal amounts in opposite directions.

4. The agricultural work machine of claim 1, wherein said first wheel and said second wheel are adjusted unequal amounts by said wheel repositioning system.

5. The agricultural work machine of claim 1, further comprising a steering angle detector configured to provide angular steering information to said wheel repositioning system, said wheel repositioning system being configured to not adjust said position of said first wheel and said second wheel dependent upon said angular steering information.

6. An agricultural work machine, comprising:
   a chassis having an operating direction; and
   a transport system coupled to said chassis, said transport system including:
   a plurality of wheels including a first wheel;
   a wheel repositioning system operatively connected to said first wheel, said wheel repositioning system configured to adjust a position of said first wheel in a direction substantially normal to said operating direction while said chassis is moving in said operating direction, said plurality of wheels further includes a second wheel, said wheel repositioning system being additionally configured to adjust a position of said second wheel in a direction substantially normal to said operating direction; and
   a row detector configured to detect a position of rows of crop stubble relative to said first wheel and said second wheel, said row detector sending row position information to said wheel repositioning system, said wheel repositioning system being configured to move said first wheel and said second wheel dependent upon said row position information.

7. The agricultural work machine of claim 6, wherein said first wheel and said second wheel are adjusted substantially equal amounts in opposite directions.

8. The agricultural work machine of claim 6, wherein said first wheel and said second wheel are adjusted unequal amounts by said wheel repositioning system.

9. The agricultural work machine of claim 6, further comprising a steering angle detector configured to provide angular steering information to said wheel repositioning system, said wheel repositioning system being configured to not adjust said position of said first wheel and said second wheel dependent upon said angular steering information.

10. A transport system couplable to an agricultural work machine with an operating direction, the transport system comprising:
   a plurality of wheels including a first wheel; and
   a wheel repositioning system operatively connected to said first wheel, said wheel repositioning system configured to adjust a position of said first wheel in a direction substantially normal to the operating direction while the agricultural work machine is moving in the operating direction, said plurality of wheels further includes a second wheel, said wheel repositioning system being additionally configured to adjust a position of said second wheel in a direction substantially normal to said operating direction, said wheel repositioning system being configured to move said first wheel and said second wheel a predetermined distance dependant upon a passage of a predetermined time.

11. The transport system of claim 10, further comprising an operator input device configured to accept a spacing selection from an operator, said input device providing information to said wheel repositioning system, said wheel repositioning system being configured to move said first wheel and said second wheel dependent upon said spacing selection.

12. The transport system of claim 10, wherein said first wheel and said second wheel are adjusted substantially equal amounts in opposite directions.

13. The transport system of claim 10, wherein said first wheel and said second wheel are adjusted unequal amounts by said wheel repositioning system.

14. The transport system of claim 10, further comprising a steering angle detector configured to provide angular steering information to said wheel repositioning system, said wheel repositioning system being configured to not adjust said position of said first wheel and said second wheel dependent upon said angular steering information.

15. A transport system, couplable to an agricultural work machine with an operating direction, the transport system comprising:
a plurality of wheels including a first wheel;
a wheel repositioning system operatively connected to said first wheel, said wheel repositioning system configured to adjust a position of said first wheel in a direction substantially normal to the operating direction while the agricultural work machine is moving in the operating direction, said plurality of wheels further includes a second wheel, said wheel repositioning system being additionally configured to adjust a position of said second wheel in a direction substantially normal to said operating direction; and
a row detector configured to detect a position of rows of crop stubble relative to said first wheel and said second wheel, said row detector sending row position information to said wheel repositioning system, said wheel repositioning system being configured to move said first wheel and said second wheel dependent upon said row position information.

16. The transport system of claim 15, wherein said first wheel and said second wheel are adjusted substantially equal amounts in opposite directions.

17. The transport system of claim 15, wherein said first wheel and said second wheel are adjusted unequal amounts by said wheel repositioning system.

18. The transport system of claim 15, further comprising a steering angle detector configured to provide angular steering information to said wheel repositioning system, said wheel repositioning system being configured to not adjust said position of said first wheel and said second wheel dependent upon said angular steering information.

19. A method of reducing tire wear on an agricultural work machine, the method comprising the steps of:
performing an agricultural function by moving a chassis in an operating direction; and
repositioning at least one wheel of the agricultural work machine in a direction substantially normal to said operating direction while said chassis is moving in said operating direction, said repositioning step repositions a plurality of wheels in a direction substantially normal to said operating direction; and
detecting a position of rows of crop stubble relative to said plurality of wheels, said repositioning step being carried out dependent upon said detecting step.

20. The method of claim 19, further comprising the step of detecting tire wear on tires mounted on said plurality of wheels, said repositioning step being carried out dependent upon said detecting step.

21. The method of claim 19, further comprising the step of accepting a spacing selection from an operator by way of an input device, said repositioning step being carried out dependent upon said spacing selection.

* * * * *